United States Patent [19]
Hyde et al.

[11] Patent Number: 5,088,341
[45] Date of Patent: Feb. 18, 1992

[54] ENGAGING LEVER LOCK FOR ROTOR TURNING GEAR

[75] Inventors: Gilbert F. Hyde, Winter Springs; David B. Berrong, Oviedo, both of Fla.

[73] Assignee: Westinghouse Electric Corp., Pittsburgh, Pa.

[21] Appl. No.: 477,399

[22] Filed: Feb. 9, 1990

[51] Int. Cl.⁵ ............... F16H 63/34; F16H 51/00
[52] U.S. Cl. ........................ 74/405; 60/39.141; 60/709; 70/283; 290/48; 290/52
[58] Field of Search .................. 74/380, 384, 405; 60/39.141, 39.142, 709; 290/2, 48, 52, DIG. 1; 70/201, 283; 335/16

[56] References Cited

U.S. PATENT DOCUMENTS

| | | | |
|---|---|---|---|
| 1,833,572 | 11/1931 | Hardesty | 70/283 |
| 3,021,719 | 2/1962 | Conrad | 74/405 |
| 3,366,900 | 1/1968 | Barkan | 335/16 |
| 3,777,291 | 12/1973 | Kroon | 335/16 |
| 3,791,231 | 2/1974 | Geary | 74/142 |
| 3,919,894 | 11/1975 | Keeter et al. | 74/384 |
| 3,960,028 | 6/1976 | Martin | 74/405 |
| 4,071,271 | 1/1978 | Bourrie et al. | 292/252 X |
| 4,148,092 | 4/1979 | Martin | 70/283 X |
| 4,430,575 | 2/1984 | Quigg | 290/48 X |
| 4,437,809 | 3/1984 | Nutter | 415/41 |
| 4,643,637 | 2/1987 | Strickler | 415/122 R |
| 4,960,006 | 10/1990 | Moore | 74/384 |

FOREIGN PATENT DOCUMENTS 140453 4/1903 Fed. Rep. of Germany ........ 70/283

Primary Examiner—Allan D. Hermann

[57] ABSTRACT

An engaging lever lock for rotor turning gear in a steam turbine includes a selectable lock that is disposed to hold the lever at its engaged position and control circuitry for activating the selectable lock. With a first embodiment, the selectable lock includes an electromagnet. On the other hand, with a second embodiment, the selectable lock includes a plunger-pin arrangement that is activated by a solenoid to extend into a hole formed in the lever, and is biased toward a retracted position away from the hole by a spring which is disposed around the pin between the plunger and the solenoid.

12 Claims, 2 Drawing Sheets

ENGAGING LEVER LOCK FOR ROTOR TURNING GEAR

BACKGROUND OF THE INVENTION

1. Field of the Invention

The present invention is related generally to rotor turning gears, and more specifically to apparatus for locking the lever that is used for engaging such rotor turning gears.

2. Statement of the Prior Art

Most large dynamoelectric machines, such as a steam turbine, are usually equipped with turning gears for rotating their rotors slowly during periods of warming up, cooling off, and particularly during shutdown periods of several days when it may be necessary to start the steam turbine again at short notice. The object of these turning gears is to maintain the rotor at approximately uniform temperatures circumferentially to assure that the rotor remains in a substantially straight, balanced condition.

Conventional turning gears generally comprise motor means for turning a gear train that is adapted for engagement with a coupling gear mounted on the rotor shaft. In order to engage and/or disengage the gear train from the coupling gear, turning gears typically include a lever that is pneumatically-operated between an engaged and a disengaged position. While these turning gears are engaged, the rotor shaft will turn at a prescribed speed. The turning gear will be automatically disengaged during start-up of the steam turbine when the speed of the rotor shaft increases above such prescribed speed.

One problem arising from these conventional turning gears is their inadvertent disengagement. That is, the speed of the rotor shaft being rotated by engaged turning gears may temporarily exceed the prescribed speed due entirely to an inadvertent source of energy such as a leakage of gland steam into the steam turbine. It can be readily appreciated, therefore, that such turning gears will prematurely disengage under these circumstances, in spite of the possibilities that the speed of the rotor shaft will undesirably be decreased on removal of the inadvertent source of energy.

A seemingly simple solution to this problem in prior art turning gears having engaging levers would be to lock such levers in place when their turning gear was engaged. However, the prior art has taught away from any approaches which would utilize engaging lever locks, since all turning gears must be capable of being automatically disengaged on demand.

SUMMARY OF THE INVENTION

Accordingly, it is a general object of the present invention to provide a simple means for locking conventional rotor turning gear. It is, more specifically, the object of the present invention to provide an engaging lever lock that not only avoids inadvertent disengagement of a rotor turning gear, but also permits automatic disengagement of such rotor turning gear on demand.

Briefly, these and other objects according to this invention are accomplished with a conventional rotor turning gear having an engaging lever by an engaging lever lock that generally comprises an electromagnetic means for holding the engaging lever locked at its engaged position, and means for activating the electromagnetic means. Electromagnetic means according to a first embodiment of this invention includes a pin, means for mating the pin with the engaging lever, and solenoid means for extending the pin to engage the mating means. Preferably, the engaging lever lock also comprises a plunger which is attached to an end of the pin and spring means for biasing the pin into a retracted position out of engagement with the mating means.

According to a second embodiment of this invention, such electromagnetic means comprises an electromagnet with an attractive force, when activated, of a predetermined strength, and suitable means for mounting the electromagnet juxtaposed to the engaging lever, whereby the attractive force maintains the engaging lever at its engaged position. The predetermined strength of the attractive force is, nevertheless, adapted to overcome any inadvertent disengaging force that acts upon the engaging lever.

The engaging lever locks, according to one important aspect of the present invention, also comprise control circuit means not only for avoiding inadvertent disengagements of the rotor turning gear from the rotor shaft, but also for enabling automatic disengagement of such rotor turning gear on demand. Preferably, the control circuit means comprises power supply means for energizing the electromagnet or the solenoid means, and normally opened switch means for preventing engagement of the engaging lever lock except in circumstances when the lever is engaged fully and the steam turbine unit is "latched".

Other objects, advantages and novel features of the present invention will become more apparent from the following detailed description thereof as considered in conjunction with the accompanying drawings wherein:

DETAILED DESCRIPTION OF THE INVENTION

Figure 1:
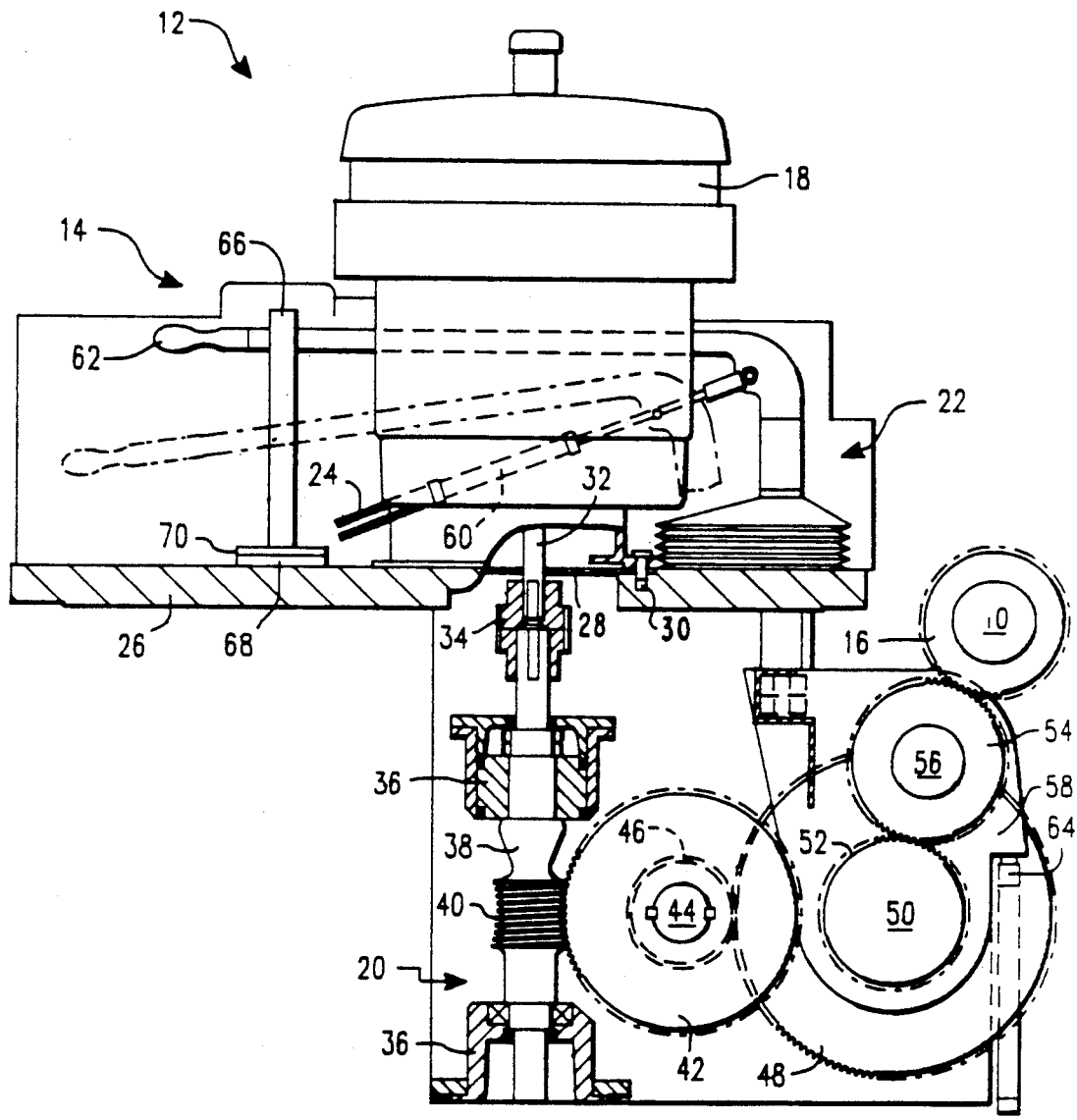
FIG. 1 illustrates, partly in section, rotor turning gear which includes an engaging lever lock, in accordance with the present invention.

Referring now to the drawings, wherein like element numbers designate like or corresponding parts throughout each of the several views, there is shown in FIG. 1 one portion of a rotor shaft 10 for a conventional dynamoelectric machine 12 (e.g., steam turbine). Such shaft 10 is adapted to be slowly rotated by conventional rotor turning gear 14 during a period when the dynamoelectric machine 12 is warming up, cooling off, and particularly during shutdown periods of several days when it may be necessary to start the dynamoelectric machine 12 at short notice. This is accomplished through engagement of the rotor turning gear 14 with a coupling spacer gear 16 which is typically located at the generator end of the turbine rotor shaft 10. In such known manners, the rotor shaft 10 is maintained at a substantially uniform temperature circumferentially, in order to assure a substantially straight condition and preserve the balance of the rotor shaft 10.

The rotor turning gear 14 generally comprises motor means 18 providing the necessary motive force to slowly rotate the rotor shaft 10, a gear train 20 that transmits this motive force from the motor means 18 to the coupling spacer gear 16, linkage means 22 for engaging the rotor turning gear 14, means 24 for activating the linkage means 22 remotely, and a housing 26 that houses the gear train 20, the linkage means 22 and the activating means 24.

Such motor means 18 suitably comprises an AC turning gear motor which has a synchronous speed of approximately 1200 revolutions per minute. Resting on a base plate 28, the motor means 18 is attached to the housing 26 by using suitable means such as a plurality of bolts 30. Part of a turning gear motor shaft 32 extends from the motor means 18, and provides a point of connection of the motor means 18 to the gear train 20. The gear train 20 is keyed to the extension 32 by a chain coupling 34 having an upper bearing 36 that is attached the housing 26. Rotation of the motor means 18 is, thus, transmitted through the chain coupling 34 to a worm shaft 38 supported by a lower bearing 36. At a portion of the worm shaft 38, approximately at its midsection, a gear 40 is formed for meshing with a worm gear 42 that is carried by, and keyed, to a first pinion shaft 44.

The first pinion shaft 44 also has formed on one end thereof a gear 46 that is adapted for meshing with a reduction gear 48. In typical arrangements of such a rotor turning gear 14, the motor means 18 rotates clockwise at approximately 1150 revolutions per minute, and transmits its motive force via the gear 40 formed on the worm shaft 38 to the worm gear 42. This worm gear 42, in turn, transmits its motive force to the first pinion shaft 44 and, thereby, causes the gear 46 formed on the first pinion shaft 44 to be rotated counterclockwise at nearly 38.33 revolutions per minute.

The reduction gear 48 is carried by and keyed to a main pinion shaft 50, and at a midsection of the main pinion shaft 50, a gear 52 is formed to be meshed with a clash pinion 54 which is, in turn, carried by a clash pinion shaft 56. In the typical arrangement referred to herein above (i.e., where first pinion shaft 44 rotates counterclockwise at about 38.33 revolutions per minute), the first pinion shaft gear 46 also rotates counterclockwise, transmits any motive force from the first pinion shaft 44 to the reduction gear 48, which in turn revolves clockwise and reduces the speed of rotation to about 10.57 revolutions per minute. By virtue of the mesh between the main pinion shaft gear 52 and clash pinion 54, the clash pinion 54 will be caused to revolve counterclockwise at about 1½ revolutions per minute.

Carrying both the main pinion shaft 50 and the clash pinion shaft 56, a clash pinion side plate 58 is connected for engagement of the rotor turning gear 14 by way of the linkage means 22. The rotor turning gear 14 is conventionally engaged with solenoid air valves (not shown) which control a double-acting air cylinder 60 in the activating means 24. Air enters one end of the air cylinder 60 (hereinafter "engage air") to engage the rotor turning gear 14, while air enters the other end of the air cylinder 60 (hereinafter "disengage air") to disengage the rotor turning gear 14. With the engage air on, an engaging lever 62 in the linkage means 22 is moved to the "IN" or engaged position shown in solid lines in FIG. 1. This causes the forward movement to be transmitted through the rest of linkage means 22 to the clash pinion side plate 58, which, in turn, is pushed forward against stop blocks 64 attached to housing means 26 causing the clash pinion 54 to mesh with the coupling spacer gear 16.

When the speed of the rotor shaft 10 increases above the prescribed speed, the torque exerted by the teeth of the rotating coupling spacer gear 16 will release the clash pinion 54. Clash pinion 54 is then forced away from the rotor shaft 10 and moves back causing the clash pinion side plate 58 and linkage means 22 to move toward the disengaged position. As the engaging lever 62 is moving toward its "OUT" or disengaged position, as shown in phantom in FIG. 1, switch means (not shown) close to energize a disengage solenoid valve (not shown) which causes disengage air to be supplied to the other end of the air cylinder 60 to permit total turning gear disengagement. The disengage air supplied to the air cylinder 60, thus causes movement of the engaging lever 62 to the "OUT" or disengaged position which, in turn, causes reverse movement of the linkage means 22 and pulls the clash pinion side plate 58 back away from the stop blocks 64, holding it and the gear 54 on the clash pinion 52 in the disengaged position.

As is known, the speed of the rotor shaft 10 may be caused to increase temporarily above its prescribed speed, and thereby leading to a inadvertent disengagement of turning gear 14. That is, the speed of the rotor shaft 10 as it is rotated by engaged turning gear 14 temporarily exceeds the prescribed speed, due for the most part to an inadvertent source of energy such as a leakage of gland steam into the steam turbine. Accordingly, an engaging lever lock 66, having means 68 for mounting the engaging lever lock 66 in close proximity to engaging lever 62, as well as one or more shims 70 to adjustably position the engaging lever lock 66, is provided by the present invention for maintaining the engaging lever 62 at its engaged position as needed.

Figure 2:
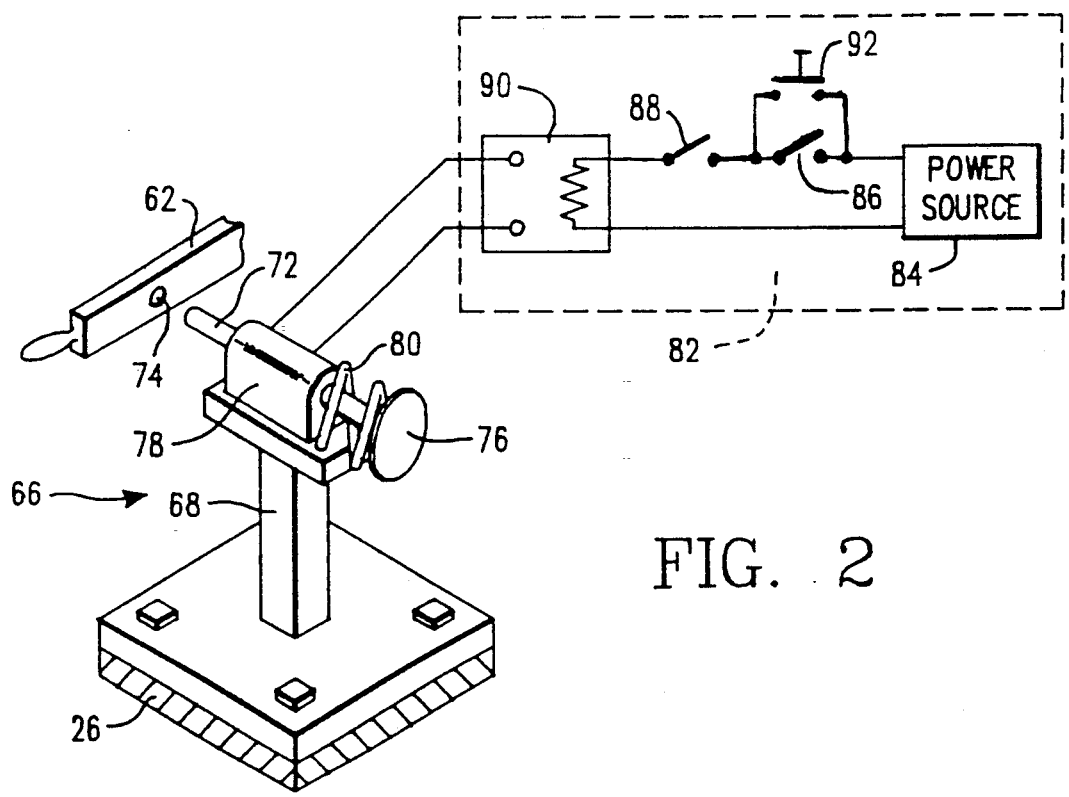
FIG. 2 is a block diagram of the engaging lever lock shown in FIG. 1 according to a first embodiment of the present invention.

In accordance with one embodiment of the invention as shown diagrammatically in FIG. 2, the engaging lever lock 66 comprises a pin 72 that is adapted to mate with a hole 74 in the engaging lever 62. Such pin 72 includes a plunger 76 at one end thereof and is operated between its retracted and extended positions by a solenoid 78. As is shown in FIG. 2, the pin 72 is normally maintained in a retracted position by a spring 80 which is disposed between the plunger 76 and the solenoid 78. When it becomes necessary to lock the engaging lever 62 at its engaged position (as shown in solid lines in FIG. 1), control circuit means 82 energizes the solenoid 78, thereby causing it to extend the pin 72 into engagement with the hole 74 formed in the engaging lever 62.

The control circuit means 82, in accordance with a presently preferred embodiment of this invention, includes a source of power 84 which may comprise alternating current or direct current, first and second switch means 86 and 88 that prevent inadvertent engagement of the engaging lever lock 66 and a relay 90 for transmitting current from power source 84 to the solenoid 78 when either a push button selector 92 or switch means 86 is closed, and switch means 88 is closed. Preferably, the first switch means 86 is "open" as long as engaging lever 62 is disengaged. When the engaging lever 62 moves to its fully engaged position to engage the rotor turning gear 14 with the coupling spacer gear 16 (FIG. 1), however, the engaging lever 62 will close the first switch means 86 to cause current from the power source 84 to flow to the relay 90. However, this current will not flow if the second switch means 88 remains open.

Second switch means 88 is adapted to be normally closed and to remain so closed as long as the dynamoelectric machine or steam turbine 12 is not latched. That is, when the condition exists such that the conventional auto-stop function or a suitable EH (i.e., electrohydraulic) trip header pressure is lacking, the second switch means 88 will be in a closed position. As EH trip header pressure increases to a sufficient level, indicating that the dynamoelectric machine 12 is prepared for operation, the second switch means 88 will open to prevent any inadvertent engagements of the engaging lever lock 66.

Such interlocking functions of the first and second switch means 86, 88 protects the rotor turning gear 14 and its associated motor means 18 by assuring that the engaging lever 62 is free to disengage when the speeds of the dynamoelectric machine or steam turbine 12 are intentionally increased (i.e., when the steam turbine 12 is "latched"). This novel feature is accomplished by preventing solenoid 78 from being energized if the rotor turning gear 14 inadvertently is moved to engage the coupling spacer gear 16 (FIG. 1) when steam turbine 12 is operating properly (i.e., "latched"). It also acts to prevent the pin 72 from being extended when the engaging lever 62 is moved towards its engaged position.

Figure 3:
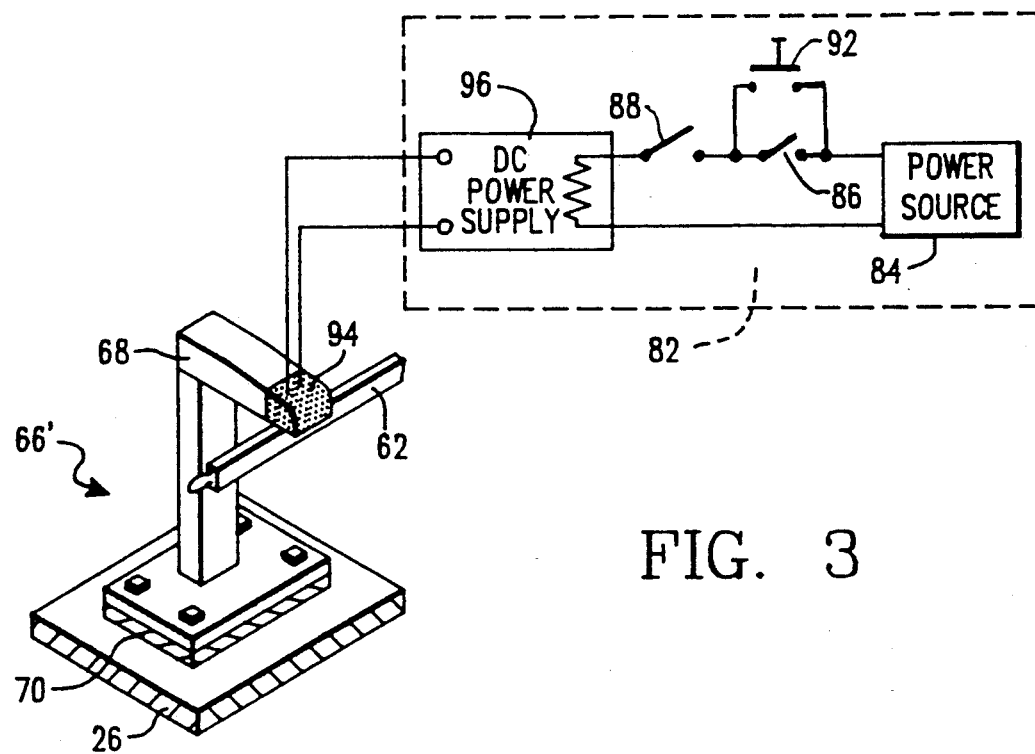
FIG. 3 is a block diagram of the engaging lever lock shown in FIG. 1, in accordance with a second embodiment of the present invention.

In accordance with another embodiment of the present invention shown diagrammatically in FIG. 3, the engaging lever lock 66' comprises an electromagnet 94 which has an attractive force, when energized as is described in greater detail herein below, of predetermined strength such that the engaging lever 62 is maintained at its engaged position. Engaging lever lock 66', like the engaging lever lock 66 shown in FIG. 2, includes means (e.g., a mounting bracket) 68 for mounting the engaging lever lock 66' in close proximity to engaging lever 62 and one or more shims 70 for adjustably positioning the engaging lever lock 66' such that the attractive force is adapted to maintain the engaging lever 62 at its fully engaged position, in spite of any inadvertent disengaging forces (e.g., leakage of gland steam into the steam turbine 12). When it becomes necessary to lock the engaging lever 62 at its engaged position (as is shown by the solid lines in FIG. 1), control circuit means 82 energizes the electromagnet 94 and causes its attractive force to attract the engaging lever 62 into a locked, fully engaged position.

The control circuit means 82, in accordance with a presently preferred embodiment of this invention, includes a source of power 84, first and second switch means 86 and 88 that prevent inadvertent engagement of the engaging lever lock 66' and a DC power supply 96 for transmitting direct current to the electromagnet 94 when either the push button selector 92 or switch means 86 is closed, and switch means 88 is closed. Preferably, the first switch means 86 is "open" as long as engaging lever 62 is disengaged. When the engaging lever 62 moves to its fully engaged position to engage the rotor turning gear 14 with the coupling spacer gear 16 (FIG. 1), the engaging lever 62 will close the first switch means 86 to cause current from the power supply 96 to flow to the electromagnet 94. However, this current will not flow if the second switch means 88 remains open.

Second switch means 88 is adapted to be normally closed and to remain so closed as long as the dynamoelectric machine or steam turbine 12 is not latched. That is, when the condition exists such that the conventional auto-stop function or a suitable EH (i.e., electrohydraulic) trip header pressure is lacking, the second switch means 88 will be in a closed position. As EH trip header pressure increases to a sufficient level, indicating that the dynamoelectric machine 12 is prepared for operation, the second switch means 88 will open to prevent any inadvertent engagements of the engaging lever lock 66'.

Such interlocking functions of the first and second switch means 86, 88 protects the rotor turning gear 14 and its associated motor means 18 by assuring that the engaging lever 62 is free to disengage when the speeds of the dynamoelectric machine or steam turbine 12 are intentionally increased (i.e., when the steam turbine 12 is "latched"). This novel feature is accomplished by preventing electromagnet 94 from being energized if the rotor turning gear 14 inadvertently is moved to engage the coupling spacer gear 16 (FIG. 1) when steam turbine 12 is operating properly (i.e., "latched").

What has been disclosed thus far is a engaging lever lock for conventional rotor turning gear. Either one of these preferred embodiments generally comprise electromagnetic means for maintaining the engaging lever at a fully engaged position and means for activating the electromagnetic means. The lever locks 66 and 66' both provide control circuit means which, not only avoids any inadvertent disengagement of the rotor turning gear from the rotating rotor shaft, but also enables automatic disengagement of such rotor turning gear on demand. Obviously many modifications and variations are possible in light of the above teachings. For example, an engaging lever lock for such rotor turning gear may simply comprise a permanent magnet that has a sufficient strength to hold the engaging lever "locked" at its fully engaged position against the force of inadvertent disengaging forces. Inadvertent disengaging forces other than the above described gland steam leakage into the steam turbine are well known to those of ordinary skill in this art. It should be understood, therefore, that the present invention may be practiced otherwise than as is specifically described herein.

What we claim as our invention is:

1. An engaging lever lock for rotor turning gear, comprising:
   (a) electromagnetic means for holding an engaging lever locked at an engaged position, said electromagnetic means comprising (i) an electromagnet having a force, when activated, of a predetermined strength adapted to overcome a disengaging force acting upon the engaging lever, said disengaging force comprising a gland steam leakage force, and (ii) means for mounting said electromagnet in a manner whereby said force maintains the engaging lever at said engaged position; and
   (b) means for activating said electromagnetic means.

2. The engaging lever lock recited in claim 1, wherein said electromagnetic means further comprises:
   a pin;
   means for mating said pin with the engaging lever; and
   solenoid means for extending said pin to engage said mating means.

3. The engaging lever lock recited in claim 2, further comprising:
   a plunger attached to one end of said pin; and
   spring means for biasing said pin into a retracted position out of engagement with said mating means.

4. A dynamoelectric machine, comprising:
   a rotor shaft;
   motor means adapted to provide a rotative force for rotating said rotor shaft;

first gear means, attached to said motor means, for transmitting said rotative force;

second gear means, attached to said rotor shaft and engageable with said first gear means to receive said rotative force, for coupling said rotative force to said rotor shaft;

lever means, coupled to said first gear means, for engaging said first gear means with said second gear means at an engaged position and for disengaging said first gear means from said second gear means at a disengaged position; and locking means for locking said lever means at its engaged position, said locking means comprising:

(a) electromagnetic means for holding said lever means locked at an engaged position, said electromagnetic means comprising (i) an electromagnet having a force, when activated, of a predetermined strength adapted to overcome a disengaging force acting upon the lever means, said disengaging force comprising gland steam leakage force, and (ii) means for mounting said electromagnet in a manner whereby said force maintains the lever means at said engaged position; and (b) means for activating said electromagnetic means.

5. The dynamoelectric machine recited in claim 4, wherein said electromagnetic means further comprises:

a pin;

means for mating said pin with the lever means;

solenoid means for extending said pin to engage said mating means.

6. The dynamoelectric machine recited in claim 5, further comprising:

a plunger attached to one end of said pin; and spring means for biasing said pin into a retracted position out of engagement with said mating means.

7. An improved steam turbine which includes a rotatable shaft, rotor turning gear means for rotating the shaft, and lever means for engaging and disengaging the rotor turning gear means, wherein the improvement comprises locking means for locking the lever means in an engaged position, said locking means comprising:

(a) electromagnetic means for holding said lever means locked at an engaged position, said electromagnetic means comprising (i) an electromagnet having a force, when activated, of a predetermined strength adapted to overcome a disengaging force acting upon the lever means, said disengaging force comprising gland steam leakage force, and (ii) means for mounting said electromagnet in a manner whereby said force maintains the lever means at said engaged position; and (b) means for activating said electromagnetic means.

8. The steam turbine recited in claim 7, wherein said electromagnetic means further comprises:

a pin;

mating means for mating said pin with the lever means; and solenoid means for extending said pin to engage said mating means.

9. The steam turbine recited in claim 8, further comprising:

a plunger attached to one end of said pin; and spring means for biasing said pin into a retracted position out of engagement with said mating means.

10. The steam turbine recited in claim 7, further comprising control circuit means coupled to said locking means for preventing inadvertent engagement of said locking means.

11. The steam turbine recited in claim 10, wherein said control circuit means comprises:

a source of power;

a first switch coupled between said source and said locking means and adapted to be opened when the lever is at a disengaged position; and a second switch coupled in series with said first switch and adapted to be opened when the rotatable shaft is rotating at a speed substantially above a speed of the rotor turning gear means.

12. The steam turbine recited in claim 11 further comprising a relay coupled between said second switch and said locking means for activating said locking means when said first and second switches are closed.

* * * * *